United States Patent Office 3,539,466
Patented Nov. 10, 1970

3,539,466
CATALYST PREPARATION
Emory W. Pitzer, Bartlesville, Okla., assignor to Phillips
Petroleum Company, a corporation of Delaware
No Drawing. Filed Oct. 16, 1967, Ser. No. 675,325
Int. Cl. B01j *11/82*
U.S. Cl. 252—421         7 Claims

ABSTRACT OF THE DISCLOSURE

Physically strong catalyst article prepared by agglomerating tin oxide particles and heating the resulting agglomerate prior to impregnation of the tin oxide with a phosphorus containing material.

---

This invention relates to a new and improved method for making a catalyst article of improved physical properties such as compressive strength. This invention relates in particular to the preparation of unitary catalyst articles useful in processes for oxidatively dehydrogenating various hydrocarbons or heterocyclic organic compounds.

Catalysts are employed in many chemical processes and, for many reasons known to those skilled in the art, are often employed in the form of a unitary article of a definite shape such as a right cylinder (pellet or tablet), sphere, and the like. These unitary catalyst articles of a definite shape or configuration, oftentimes called agglomerates, can lack sufficient physical strength to withstand transportation, handling, and actual shipment from their point of manufacture to their point of use in a chemical process. When these catalyst articles have chips removed therefrom or are otherwise generally abraded by physical activity, a substantial portion of the catalyst is lost for all practical purposes since particles or dust produced by such erosion may be lost from the reactor or may need to be removed from the catalyst mass to prevent excess pressure in the reactor. Generally, rebuilding of eroded catalyst articles is impractical since these articles are normally used at points far removed from their point of manufacture.

Quite surprisingly, it has now been found that a catalyst article of improved physical strength, particularly improved compressive strength, can be formed from certain catalytic components by following a precise sequence of steps.

According to this invention a catalyst article is formed into any desired shape or configuration by agglomerating or otherwise forming a plurality of tin (stannous and/or stannic) oxide particles into the desired shape, heating the article at a temperature of at least 400° F., and thereafter impregnating the heat treated article with a phosphorus-containing liquid capable of reacting at least in part with tin oxide to form at least some tin phosphate. The thus-formed catalyst article will exhibit surprisingly greater physical strength as compared to a similar article formed from similar materials but without following the sequence of steps: agglomeration followed by heat treatment followed by impregnation.

The catalyst articles of this invention are useful in many chemical processes. For example, the catalyst articles of this invention are useful in oxidatively dehydrogenating organic materials such as monoolefins to form conjugated diolefins such as butadiene and isoprene. Such a process is fully and completely disclosed in U.S. 3,320,329, the disclosure of which is hereby incorporated herein by reference. The butadiene and isoprene formed from an oxidative dehydrogenation process employing the catalyst of this invention are useful in conventional polymerization processes for forming rubbery polymers which rubbery polymers in turn are used in preparing rubber articles of commerce such as automobile tires.

Accordingly, it is an object of this invention to provide a new and improved process for preparing physically strong catalyst articles.

It is another object of this invention to provide a new and improved process for making catalyst articles of improved compressive strength for use in oxidative dehydrogenation processes.

Other aspects, objects, and advantages of this invention will be apparent to one skilled in the art from the following description and appended claims.

According to this invention a plurality of tin oxide, preferably stannic oxide ($SnO_2$), particles, preferably of the size which passes through a 200 mesh sieve, U.S. Sieve Series, is agglomerated or otherwise formed into a unitary catalyst article of definite shape.

Any conventional agglomeration process such as pelleting by use of pressure, extruding, granulating, and the like can be employed. Conventional agglomerating equipment known in the art can be employed to effect this step of the invention. The agglomerating equipment and process will vary greatly depending upon many factors such as the particular use to which the final catalyst article is to be employed. For example, relatively small catalyst articles would be more suitable for a fluidized bed system while larger articles may be more suitable for a fixed bed catalyst system. The catalyst article can be formed from catalyst particles by confining a plurality of such articles in a confined zone and applying thereto a pressure of at least 25 pounds load. For example, pressures of from about 25 to about 250 pounds load can be employed for right cylindrical tablets about ⅛-inch in diameter and height. The compressing step can be carried out in the presence of conventional lubricants, e.g. a homopolymer of ethylene having a density of at least 0.914 gram per cubic centimeter at 25° C. The amount of lubricant employed can vary widely but will generally be from about 0.25 up to about 5 weight percent based upon total weight of the particles being compressed together.

The thus-formed unitary tin oxide article is then heat treated at a temperature of at least 400° F. but below the melting point of the tin oxide, preferably from about 400 to about 1200° F. for at least 5 minutes, preferably from about 3 to about 12 hours. The heat treatment can be carried out in the presence of substantially any atmosphere which is substantially inert to the tin oxide. The heat treatment is preferably effected in the presence of an oxygen-containing gas such as air, especially if a lubricant is employed in the process to agglomerate the tin oxide article. If a lubricant is employed, the tin oxide article is preferably initially heated to a temperature less than 1000° F. in the presence of oxygen to remove the lubricant, the tin oxide article is then preferably further heat treated at temperatures up to about 1200° F. This preferred procedure is desirable as a means of preventing overheating because of oxidation of lubricant.

Thereafter, the unitary tin oxide article, preferably after cooling substantially to ambient temperatures such as room temperature, is impregnated with a phosphorus-containing compound which is capable of reacting at least in part with tin oxide to form at least some tin phosphate. Generally, any phosphorus-containing compound, preferably a liquid, capable of reacting with tin oxide to form some tin phosphate is suitable, e.g. phosphoric acid, phosphorous acid, phenylphosphoric acid, phosphorous tetraoxide, phosphorus pentoxide, phosphorous trioxide, hypophosphoric acid, hypophosphorous acid, ammonium phosphate, and the like. The impregnation step can be carried out by immersing the tin oxide article in the phosphorus-containing compound or otherwise contacting the tin oxide article with the phosphorus-containing compound at ambient temperatures such as room temperature (about 25° C.) for at least 30 seconds. The impregnation step, including the amount of phosphorus-containing compound employed in that step, should be controlled so as to add to the tin oxide articles being impregnated from about 0.1 to about 15 weight percent phosphorus based upon the total weight of the final unitary catalyst article, i.e. the catalyst article containing both tin and phosphorous as to be employed in the chemical process.

The impregnated-heat treated catalyst article can then be recovered in any conventional manner such as by simply drying the article in any conventional manner as heating same at temperatures up to 100° F., simply air drying the catalyst article at room temperature, or by heating the articles with infrared radiation.

If desired, the impregnated-heat treated catalyst article can be reimpregnated with a phosphorus-containing liquid as described above and in the same manner as described and/or recalcined in the same manner described above. The reimpregnation step or re-heat treatment step or both can be repeated one or more times as desired. For example, the impregnated-heat treated catalyst article can be reimpregnated with the same or a different phosphorus-containing liquid two or more times, each reimpregnation step being followed by a heat treatment step as practiced in accordance with the first heat treatment step described above. Also, more than one reimpregnation step can be practiced before a re-heat treatment step is carried out.

EXAMPLE I

In this example five separate runs were made for preparing a unitary catalyst article from tin oxide particles and an aqueous phosphoric acid solution. The tin oxide particles employed had a particle size of less than 200 mesh. In all five runs the amount of phosphoric acid solution employed was sufficient to produce a final, unitary catalyst article containing about 5 weight percent phosphorus based upon the total weight of that catalyst article.

The first run was not carried out in accordance with the invention in order to give a control run. In the first run the stannic oxide particles were soaked in the phosphoric acid solution at room temperature for 5 minutes, removed from the solution by filtering, and dried in air for 6 hours at about 25° C. The dried catalyst particles were then calcined at 1100° F. for 2 hours. The dried, impregnated tin oxide particles were screened and those which passed through a 20 mesh sieve (U.S. Sieve Series) were mixed with 1 weight percent of a homopolymer of ethylene. The polyethylene was used as a lubricant to facilitate movement of the particles towards one another during the agglomeration step and to facilitate removal of the tablet from the die in which it is formed.

The catalyst particles containing the polyethylene were then subjected to an agglomeration step which comprised filling a cylinder ⅛-inch in diameter with about ⅛-inch height of the mixture of catalyst particles and polyethylene and then subjecting the particles in the cylinder to a compression load of about 80 pounds.

The results of this first run were unsuccessful in that a unitary, cohesive cylinder of catalyst particles could not be obtained, the catalyst article tending to break down quite readily into smaller catalyst particles. In a test of the catalyst articles' compressive strength wherein compressive forces were applied to opposite sides of the right cylindrical catalyst article, the catalyst article crumbled under such slight compressive forces that the article's strength was less than 1 pound load.

The second run was carried out according to the invention wherein similar stannic oxide particles of the same size as those employed for the first run above were mixed with 1 weight percent of the same polyethylene as used in the first run and then agglomerated to form a right cylindrical stannic oxide article ⅛-inch in diameter and approximately ⅛-inch in height using a compression load of about 30 pounds. The thus-formed unitary catalyst article was then heat treated in air at 1100° F. for 3 hours. The heat treated stannic oxide right cylinders were then impregnated with phosphoric acid by soaking in the phosphoric acid solution of Run 1 at room temperature for 5 minutes. Thereafter, the impregnated-heat treated catalyst articles were removed from the phosphoric acid solution by filtering and dried in air at 300° F. for approximately 16 hours. These catalyst articles, when subjected to compressive forces acting towards one another from either side thereof failed by crumbling under a compressive force of 6½ pounds load. This was a surprising increase over the less than 1 pound load strength of the noninvention catalyst article of the first run.

The process of the second run was repeated three times in the same manner except that increased drying temperatures were employed. The unitary catalyst articles produced by each run were tested for compressive strength in the same manner as the catalyst articles of the second run and the results were as follows:

TABLE I

| Run No. | Drying temperature, ° F. | Catalyst article strength,[1] pounds load |
|---|---|---|
| 3 | 600 | 11.4 |
| 4 | 800 | 13.4 |
| 5 | 1,100 | 13 |

[1] At least 25 catalyst articles were crushed in each test.

The data of Table I show that as the drying temperature increased into the temperature range of heat treating, i.e. at least 400° F., the catalyst article strength substantially increased. Thus, re-heat treatment of the impregnated-heat treated catalyst article can improve the strength of the catalyst article.

EXAMPLE II

Stannic oxide particles of less than 200 mesh size were formed into right cylinder stannic oxide articles ⅛-inch in length and ⅛-inch in diameter in the same manner as set forth in Example I. The articles were heat treated in air at 1100° F. for 3 hours. Four portions of the heat treated stannic oxide articles of about 100 articles each were then impregnated by soaking same in aqueous solutions of phosphoric acid containing various weight percentages of phosphoric acid for 5 minutes at room temperature. Thereafter, the impregnated-heat treated catalyst articles were separated from the phosphoric acid solution, allowed to drain, and dried in air at about 25° C. The four portions of dry catalyst articles were then re-heat treated at 1100° F. in air for 2 hours. Thereafter, the re-heat treated catalyst articles were cooled to room temperature and tested for their crush strength in the same manner set forth in Example I.

The process just described in this example was repeated except that a quantity of the stannic oxide articles was impregnated with phosphoric acid before heat treatment in air at 1100° F. for the same time length as set forth above. Thus, for this second or control process the sequence of steps was: formation of the stannic oxide article, impregnation of the article with phosphoric acid, and then heat treatment at 1100° F. as opposed to the first or invention process described above wherein the stannic oxide article was formed first, then heat treated at 1100° F., and only then impregnated with phosphoric acid. The catalyst articles produced by this second process or control process were tested in the same manner as Example I. The results of the crush strength tests for both the invention process and control process were as follows:

TABLE II

| Wt. percent $H_3PO_4$ in impregnation solution | Approximate wt. percent of phosphorus added based on total weight of catalyst article | Invention process,[1] ave. strength pounds load | Control process,[1] ave. strength pounds load |
|---|---|---|---|
| 0 ($H_2O$ only) | 0 | 7.6 | 8.3 |
| 16 | 1 | 9.3 | 4.0 |
| 31 | 2 | 11.5 | 2.9 |
| 85 | 6 | 16.2 | 7.0 |

[1] At least 25 catalyst articles were crushed in each test.

These data show that the invention process obtained surprisingly greated catalyst article strength when phosphoric acid was added after the tin oxide cylinders had been calcined.

Reasonable variation and modification are possible within the scope of this disclosure without departing from the spirit and scope thereof.

That which is claimed is:

1. In a method for making a catalyst article of improved physical strength, the improvement comprising agglomerating tin oxide particles into an article, heating said article at a temperature ranging from about 400 to about 1200° F. but below the melting point of the tin oxide for at least 5 minutes, impregnating the heat treated article with a phosphorus-containing compound selected from the group consisting of phosphoric acid, phosphorous acid, phenylphosphoric acid, prosphorous tetraoxide, phosphorus pentaoxide, phosphorous trioxide, hypophosphoric acid, hypophosphorous acid, and ammonium phosphate capable of reacting at least in part with tin oxide to form at least some tin phosphate, and substantially drying the catalyst article.

2. The method according to claim 1 wherein said tin oxide particles pass through a 200 mesh sieve, said tin oxide particles are compressed to form said unitary article under a pressure of at least 25 pounds load, the heating of said unitary article is carried out in the presence of an oxygen-containing atmosphere, and the amount of impregnation liquid is that sufficient to add from about 0.1 to about 15 weight percent phosphorus based on the total weight of the final catalyst article.

3. The method according to claim 2 wherein said tin oxide is stannic oxide, said oxygen-containing atmosphere is air, and said impregnation compound is an aqueous solution of phosphoric acid.

4. The method according to claim 3 wherein the stannic oxide particles are compressed to form said unitary article in the presence of up to about 5 weight percent of a homopolymer of ethylene based on the total weight of the stannic oxide particles being compressed together.

5. The method according to claim 1 wherein said impregnating step, said heating step or both steps are repeated at least one additional time.

6. The method according to claim 1 wherein the impregnated-heat treated catalyst article is dried and then reheat treated at a temperature of at least 400° F. but below the melting point of the tin oxide for at least 5 minutes.

7. The method according to claim 1 wherein said agglomeration step is carried out in the presence of a lubricant which facilitates movement of the tin oxide particles towards one another during said agglomeration step and removal of the catalyst article from the die in which it is formed.

References Cited

UNITED STATES PATENTS

| | | | |
|---|---|---|---|
| 3,051,662 | 8/1962 | Pitzer | 252—430 |
| 3,162,607 | 12/1964 | Burbidge | 252—477 |
| 2,324,079 | 7/1943 | Greger | 210—205 |
| 2,569,092 | 9/1951 | Deering | 252—435 |
| 2,496,621 | 2/1950 | Deery | 260—641 |
| 2,575,457 | 11/1951 | Mavity | 252—435 |
| 3,320,329 | 5/1967 | Nolan | 260—680 |
| 2,251,580 | 8/1941 | Ruthruff | 196—10 |

PATRICK P. GARVIN, Primary Examiner

P. M. FRENCH, Assistant Examiner

U.S. Cl. X.R.

252—437